United States Patent [19]
Paul, Jr.

[11] 3,765,645
[45] Oct. 16, 1973

[54] TOP-LOADED BALL VALVE
[76] Inventor: Herman L. Paul, Jr., Wyomissing, Pa.
[22] Filed: Nov. 30, 1971
[21] Appl. No.: 203,213

[52] U.S. Cl........... 251/170, 220/55 Y, 220/55 AN, 251/159, 251/163, 251/188
[51] Int. Cl.............................................. F16k 5/14
[58] Field of Search..................... 251/159, 160, 161, 251/162, 163, 170, 171, 187, 188; 220/55 F, 55 I, 55 AN, 55 Z, 55 K, 55 Y, 55 R

[56] References Cited
UNITED STATES PATENTS

| | | | |
|---|---|---|---|
| 2,788,017 | 4/1957 | Scherer | 251/170 X |
| 3,398,763 | 8/1968 | Richards | 251/188 X |
| 3,038,693 | 6/1962 | Dumm | 251/171 |
| 3,245,653 | 4/1966 | Lavigueur | 251/159 |
| 3,572,370 | 3/1971 | Engle | 251/163 X |

FOREIGN PATENTS OR APPLICATIONS
17,310   0/1915   Great Britain ................ 220/55 AN

*Primary Examiner*—Harold W. Weakley
*Attorney*—Thomas E. Tate

[57] ABSTRACT

A ball valve including a housing consisting of a body and a bonnet. The body has a horizontal through passage and a vertical opening extending downwardly from its top and communicating with the passage intermediate its ends. The bonnet is right circular cylindrical and registers with the upper portion of the vertical opening. The bonnet is removably coupled to the body by a ball securing means which is positioned in aligned annular grooves in these parts. A ball plug is located in the housing and has a through passage which is adapted to be placed into and out of communication with the body passage. Also located in the housing are spaced first and second support rings which bear against corresponding end surfaces of the ball plug. The inner and outer end faces of the first support ring are planar and upwardly convergent. An adjusting ring is mounted against the outer surface of the first support ring and is vertically slidable therealong. The inner and outer face surfaces of the adjusting ring are planar and downwardly convergent. The bonnet carries a vertically movable rod which is coupled to the adjusting ring for varying its vertical position.

6 Claims, 5 Drawing Figures

Patented Oct. 16, 1973

INVENTOR.
HERMAN L. PAUL, JR.
BY
*F. J. Pizarra*

ATTORNEY

Patented Oct. 16, 1973  3,765,645

INVENTOR.
HERMAN L. PAUL, JR.
BY
F. J. Pisarra
ATTORNEY

TOP-LOADED BALL VALVE

BACKGROUND OF THE INVENTION

This invention relates to the art of valves for controlling fluid flow and, more particularly, to a ball type control valve having improved features of design and construction.

The invention pertains, in one of its more specific aspects, to a valve including a body having a horizontal through passage and a rotatable ball plug within the body and having a through passage adapted to be placed into and out of communication with the body passage. The valve parts are so designed, constructed and arranged as to permit of ready and convenient assembly, adjustment and subsequent removal from the top of the valve body of all internal parts.

There have been many developments over the years in the general field of ball valves and a number of advances in the more specific field of ball plug valves. Recent advances in the latter field are exemplified by the construction disclosed in my U.S. Pat. No. 3,556,471, granted January 19, 1971, for "Ball Valve".

The ball valve of this invention differs in a number of important respects over known prior art valves. For one thing, the parts of this valve are, as indicated above, so designed, constructed and arranged as to permit ready and convenient assembly, adjustment and subsequent removal of internal parts by way of the top of the valve body. Consequently, the valve affords ready access to and withdrawal, for purposes of inspection and replacement as required, of parts which are more subject to wear than other parts without disconnecting the valve from a fluid flow line after it has been installed in the flow line.

As will be evident from the ensuing discussion and detailed description, the ball valve of this invention affords a number of worthwhile advantages and benefits as compared to similar known valves.

SUMMARY OF THE INVENTION

The ball valve of this invention includes a housing consisting of a body and a bonnet carried by the body. The body is formed with a horizontal through passage and a vertical opening extending downwardly from its top and communicating with the passage intermediate its ends. The bonnet is right circular cylindrical and registers with the upper portion of the vertical opening. The bonnet is removably attached to the body by securing means including a plurality of balls which are positioned in aligned annular grooves in the body and bonnet. Located within the body is a ball plug having a horizontal through passage which is adapted to be placed into and out of communication with the body passage in response to rotation of the ball plug about a vertical axis. Positioned within the body are spaced first and second support rings having concave inner surfaces which bear against corresponding ends of the ball plug. The inner and outer face surfaces of the first support ring are planar and upwardly convergent. Also positioned within the body and bearing against the outer face of the first support ring is an adjusting ring which is vertically slidable along the first support ring. The inner and outer faces of the adjusting ring are planar and downwardly convergent. The valve also includes a vertically movable rod which is carried by the bonnet and is coupled to the upper portion of the adjusting ring for varying the vertical position of the adjusting ring relative to the first support ring.

This invention has for its principal object the provision of a ball valve having improved features of design and construction.

Another object of the invention is to provide a ball valve comprised of a housing consisting of a body having a horizontal through passage and a vertical opening extending downwardly from its top and a bonnet registering with the upper portion of the vertical opening; and internal parts within the body and including a ball plug, a tubular retainer, a pair of spaced support rings and an adjusting ring, said internal parts being adapted to be readily assembled within the body and subsequently removed therefrom for purposes of inspection or replacement of worn parts by way of the vertical opening without disconnecting the valve from a fluid flow line after the valve has been placed in the flow line.

Another object of the invention is to provide a ball valve, constructed as outlined in the preceding object, in which one of the support rings and the adjusting ring are wedge-like and contiguous, the adjusting ring being vertically slidable relative to such support ring and arranged to vary the loading on the valve.

A further object of the invention is to provide a ball valve of the stated type having improved securing means incorporated therein.

The invention has for a still further object the provision of a ball valve of the character indicated which is simple and compact in design; which is sturdy and durable in construction; which is reasonable in manufacturing, installation and maintenance costs; which may be made in a wide range of sizes and flow capacities; which permits of ready access to and replacement of internal parts that are subject to wear; and which is adapted to carry out its intended functions in an efficient and dependable manner.

The enumerated objects and additional objects, together with the advantages of this invention, will be apparent to persons trained in the art from the following detailed description and the accompanying drawings which respectively describe and illustrate a preferred embodiment of the invention.

BRIEF DESCRIPTION OF THE DRAWINGS

In the drawings wherein like reference numerals denote corresponding parts in the several views.

DESCRIPTION OF THE PREFERRED EMBODIMENT

Figure 1:
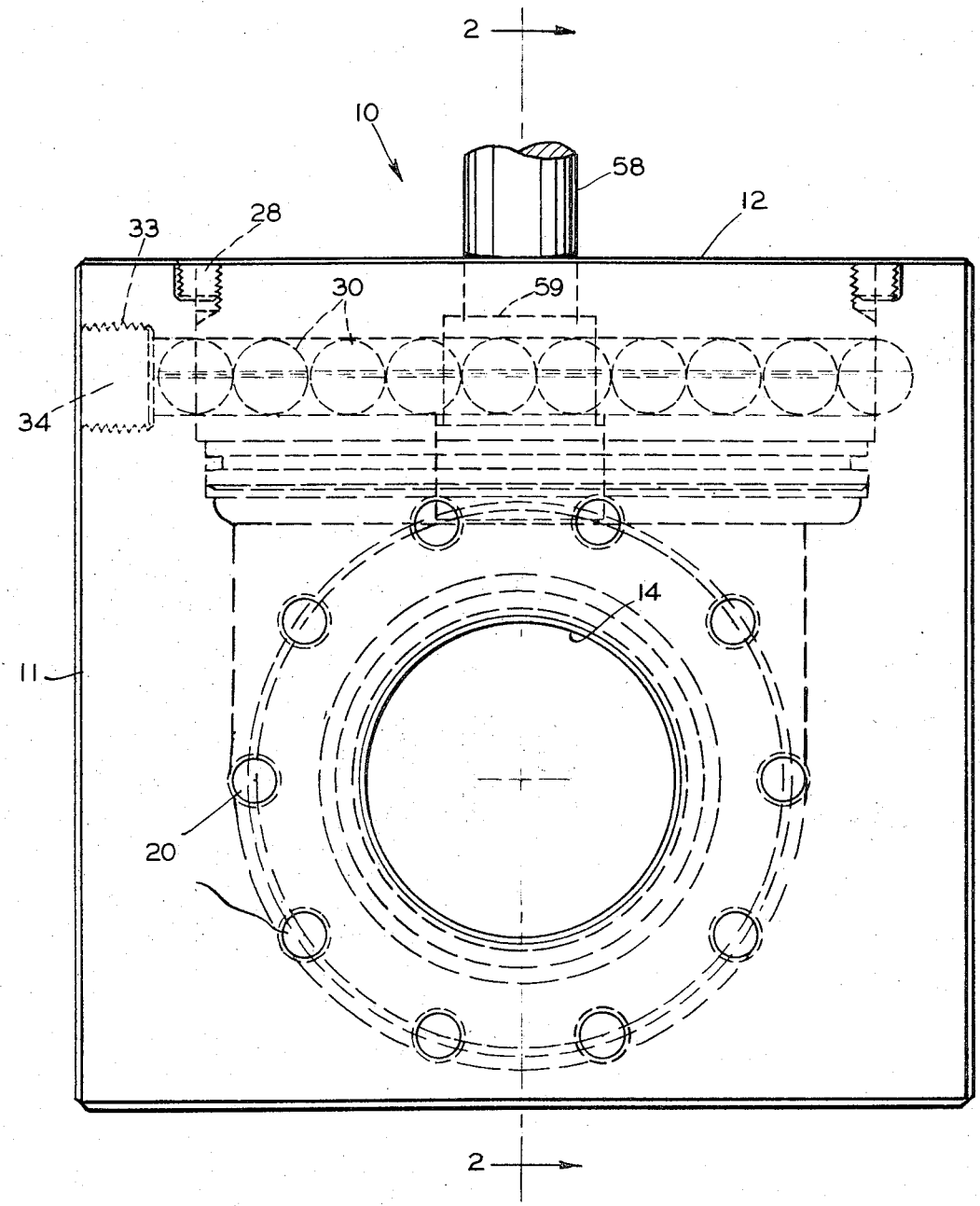
FIG. 1 is an end elevation view of a ball valve constructed in accordance with this invention.
Figure 2:
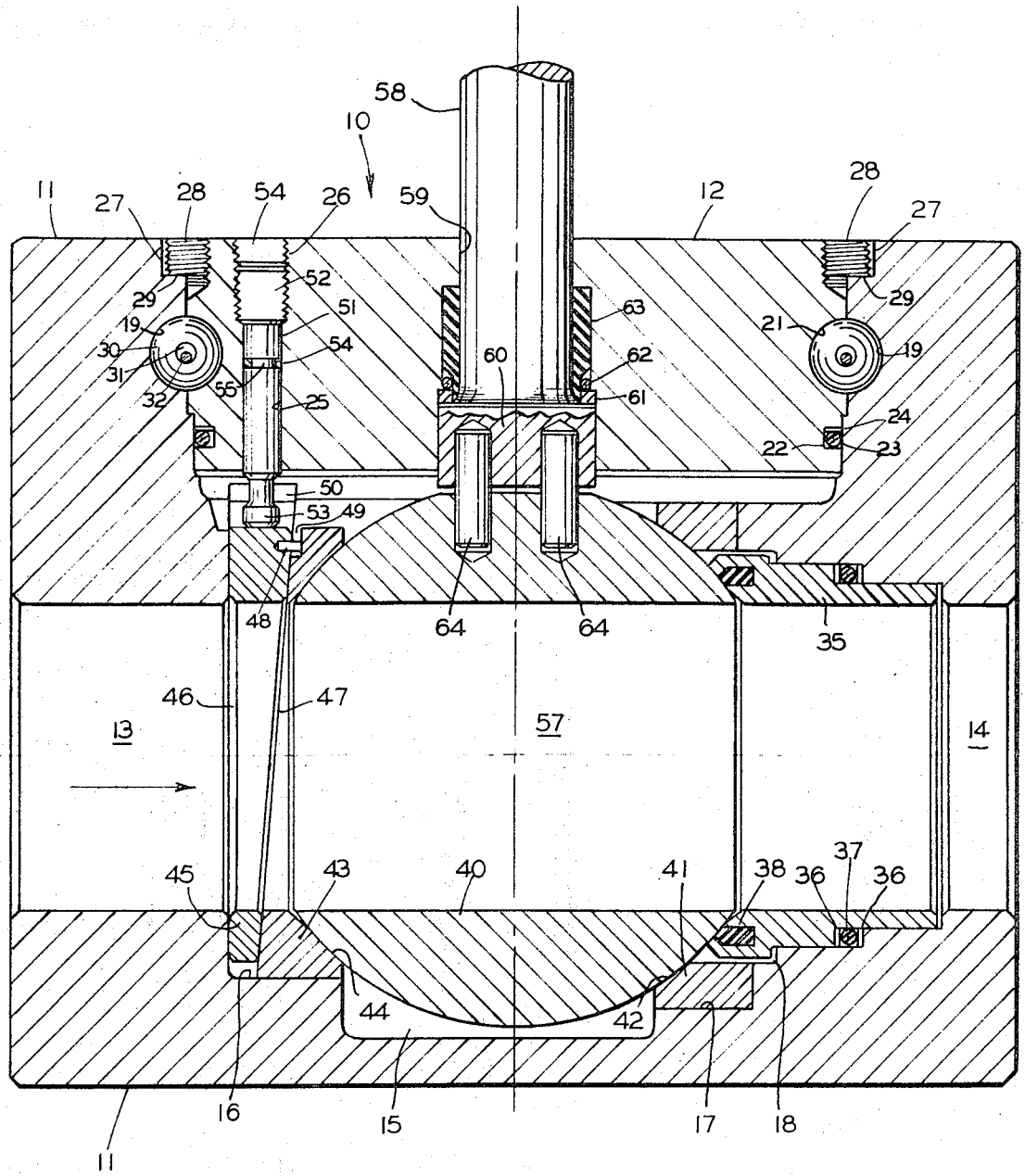
FIG. 2 is a central cross sectional view taken along line 2—2 of FIG. 1.

Referring initially to FIGS. 1 and 2, the therein illustrated ball valve includes a housing 10, consisting of a body 11 and a bonnet 12. The body is provided with a horizontal through passage having an inlet end 13 and an outlet end 14. The body is also provided with a central vertical opening 15 which extends downwardly from its upper surface, which communicates with the body passage intermediate its inlet and outlet ends, and which terminates below the body passage.

The body is formed with a plurality of recesses, including a generally U-shaped recess 16, a generally C-shaped recess 17 and a stepped recess 18, which merge with the body passage and opening 15, and an internal annular groove 19 which is substantially semicircular in transverse configuration. The body is provided at each end with a plurality of angularly spaced blind taps 20 (FIG. 1) for connection by means of studs (not shown) to piping flanges (also not shown) in a fluid flow line. If desired, taps 20 may be omitted and the ends of body 11 may be permanently affixed to the piping flanges by welding.

Figure 3:
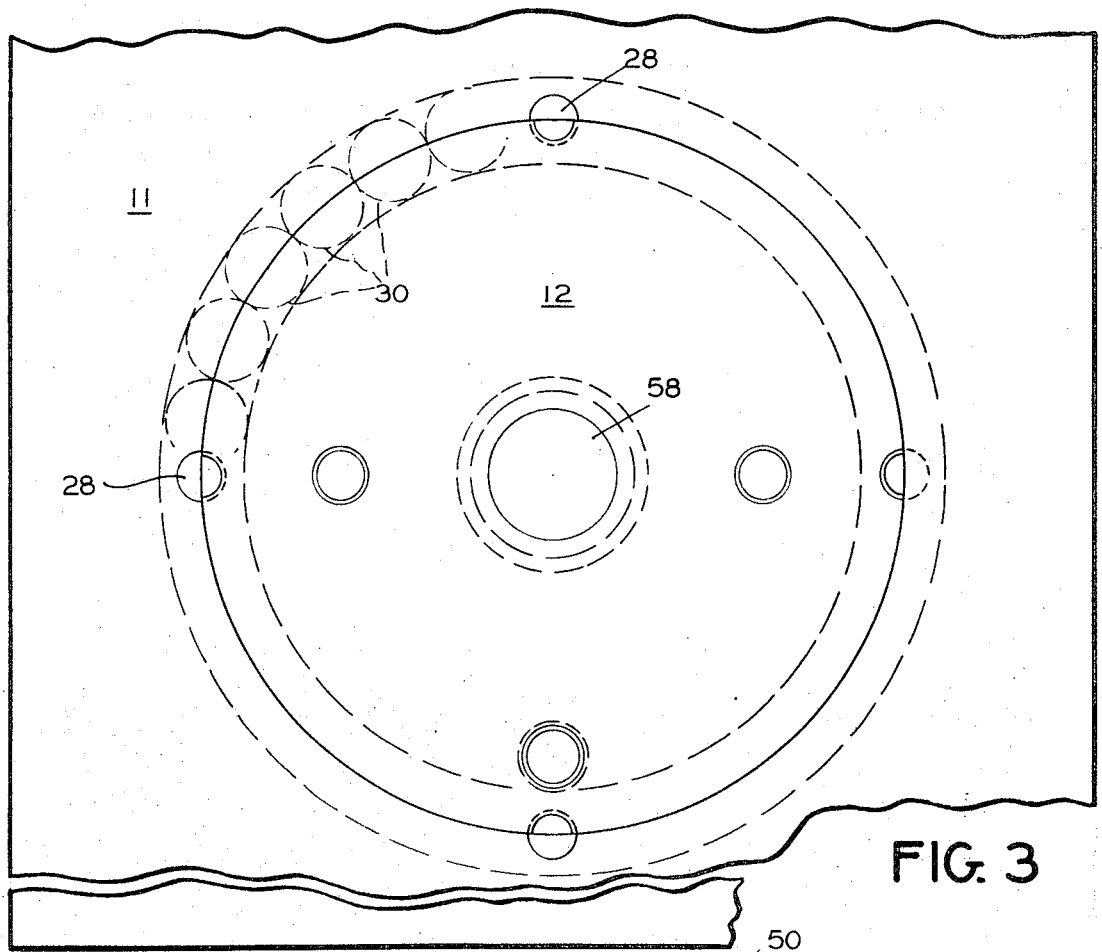
FIG. 3 is a top plan view of the valve of FIGS. 1 and 2, portions being omitted.

Bonnet 12 is right circular cylindrical, is removably positioned in the upper portion of body opening 15 and forms an accurate fit with the body. The bonnet is provided with a first annular groove 21 which is substantially semicircular in transverse configuration and a second annular groove 22 which is rectangular in transverse configuration (FIG. 2). Annular groove 22 contains an O-ring 23 and a backing ring 24. The bonnet is also provided with a vertical drill hole 25 having an enlarged threaded upper end portion 26. Formed in the upper ends of body 11 and bonnet 12 is a plurality of blind taps 27 which are spaced apart (FIG. 3) with their central lines on the circumference of a circle which is coincident with the common line at the upper inner end of body opening 15 and the upper surface of the bonnet. Each tap is partly in body 11 and partly in bonnet 12 and is provided with a corresponding set screw 28 which bears against a shoulder 29 in the body. This arrangement of taps 27, set screws 28 and shoulders 29 effects coupling between the body and the bonnet and permits slight vertical adjustment of the bonnet relative to the body.

As is shown in FIG. 2, body groove 19 and bonnet groove 21 define an internal annular passage which is substantially circular in transverse configuration when body 11 and bonnet 12 are in the illustrated relative position. This passage accommodates a plurality of securing balls 30 which are preferably made of stainless steel and are provided with corresponding openings 31. Balls 30 are strung in the manner of beads along a flexible connector, such as a wire 32. The ends of wire 32 terminate in a blind tap 33 in a side of the body (FIG. 1) and are anchored to the body by a set screw 34.

Positioned within body passage 15 and registering with body recess 18 is a tubular seat retainer 35 which is made from a suitable bearing material, such as aluminum-bronze. A pair of backing rings 36 and an O-ring 37 are interposed between seat retainer 35 and body 11 to provide an effective fluid seal. A ring-type seat insert 38 is carried at the inner end of the seat retainer and provides an effective fluid seal with a ball plug 40. Insert 38 is made of a suitable synthetic plastic composition, such as the material which is manufactured and marketed in this country under the trademark "Nylotron" by Polymer Corp., Reading, Pennsylvania. Concentric with and surrounding the inner end of seat retainer 35 is a support ring 41 which registers with body recess 17. The inner end of ring 41 is concave, as indicated at 42, to provide a seating surface for ball plug 40.

A second support ring 43 registers with body recess 16. As in the case of support ring 41, the inner end of support ring 43 is concave, as indicated at 44, to provide a corresponding seating surface for the ball plug.

The outer and inner end surfaces of support ring 43 are planar and converge upwardly, as shown in FIG. 2. As a consequence, this support ring is in the nature of a wedge member.

Figures 4, 5:
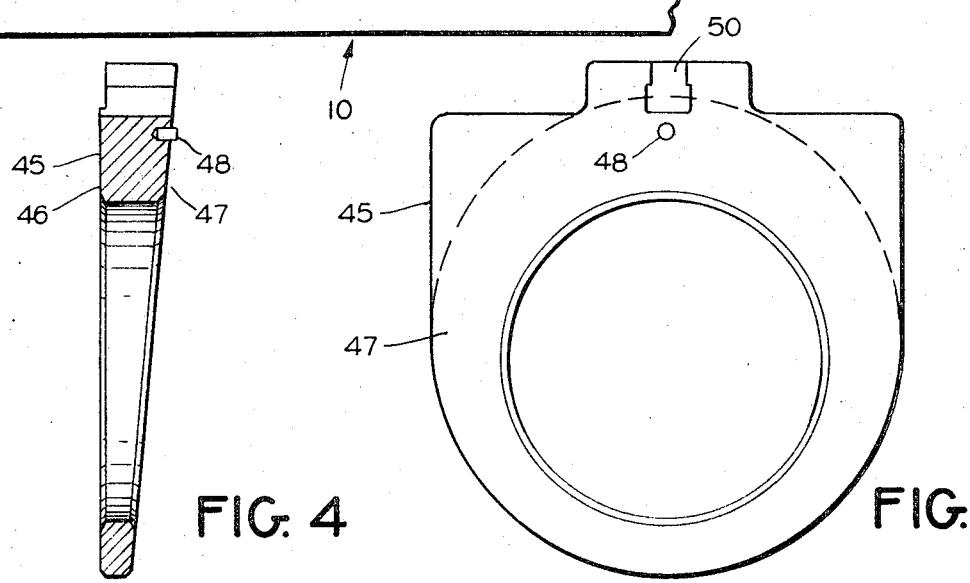
FIG. 4 corresponds to a portion of FIG. 2 and illustrates a wedge member alone.
FIG. 5 is an elevation view of the wedge member as seen from the right of FIG. 4.

Also registering with body recess 16 and positioned along the outer end of support ring 43 is an adjusting ring 45, which is best shown in FIGS. 2, 4 and 5, to which reference is now had. As is illustrated in FIG. 4, the outer end surface 46 and the inner end surface 47 of ring 45 are planar and converge downwardly. Thus, this ring is also in the nature of a wedge member.

When the parts are in the relative position shown in FIG. 2, the outer end surface of support ring 43 is in intimate contact with the inner surface 47 of adjusting ring 45; and the inner surface of support ring 43 is parallel to the outer surface 46 of the adjusting ring. This condition prevails at all times in the assembled valve. The adjusting ring is equipped with a guide pin 48 which registers with a guide slot 49 in support ring 43. Extending downwardly from the upper surface of adjusting ring 45 is an inverted, T-shaped, through slot 50.

The valve also includes a means, such as a rod 51, for adjusting the vertical position of support ring 43. Rod 51 extends through bonnet drill hole 25 and has an enlarged threaded upper end part 52, which engages the threaded upper end of the drill hole, and a head 53, which is disposed in adjusting ring slot 50. The rod carries an O-ring 54 which is retained in an annular groove 55 and provides a fluid seal.

It will be evident from an examination of FIG. 2 that the vertical position of ring 45 may be readily adjusted by turning rod 51 in a corresponding direction. Inasmuch as adjusting ring 45 and support ring 43 are in the nature of wedge members, such vertical adjustment of ring 45 permits corresponding lateral movement of the support ring, i.e., toward the right or the left as viewed in FIG. 2. The bonnet is equipped with a threaded plug 54 in the upper end of drill hole 25 which serves as a closure therefor and protects rod 51 against accidental turning or tampering after the valve has been adjusted.

Referring again to ball plug 40, the same is preferably made of an appropriate ceramic composition but may, if desired, be made of stainless steel or other suitable material. The ball plug has a through opening 57 which communicates with valve inlet 13 by way of the openings defined in support ring 43 and adjusting ring 45 and with outlet 14 by way of tubular seat retainer 35 when the parts are in the relative position shown in FIG. 2.

The valve additionally includes an operating stem 58 which extends through a central through opening 59 in bonnet 12. The operating stem has an enlarged head 60 at its lower end. Interposed between the operating stem and the bonnet and arranged as shown are a bearing ring 61, an O-ring 62 and an elongated sealing ring 63. A pair of spaced parallel pins 64 are press-fitted into corresponding blind openings in stem head 60 and are removably received in aligned openings at the top of the ball plug. These pins serve to removably couple the operating stem to the ball plug.

It is believed clear from FIG. 2 that the subject valve is adapted to be readily operated to effect any desired position of ball plug 40 between fully opened position, as shown in that view, and fully closed position, by turning operating stem 58 through 90°. The valve parts are so designed, constructed and arranged as to permit ready and convenient removal of all internal parts from the top of the valve without disconnecting the valve from a flow line after installation. The unique arrangement of the wedge-like parts, namely, support ring 43 and adjusting ring 45, serves the dual functions of affording clearance for removal and access to internal parts and for adjusting bearing clearances for the several support rings. In the case of a full floating valve, the wedge arrangement permits ready adjustment of the prestress force applied to the ball plug.

The incorporation of securing balls 30 and their flexible connector 32 in the illustrated embodiment of the inventive valve is considered superior to conventional bolted bonnet valves, particularly in maritime service, for the reason that it affords "breathing" as compared to the use of studs or bolts which frequently rupture under shock or vibrational conditions.

Based on the foregoing, it is believed that the construction, operation, objects and advantages of my present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

I claim:

1. A ball valve comprising a housing including a body having a substantially horizontal through passage and a substantially vertical opening extending downwardly from the top of the housing, said vertical opening communicating with the passage intermediate its ends and terminating therebelow, and a bonnet extending across the upper portion of the vertical opening and removably secured to the body; a generally spherical ball plug within the housing and having a through opening adapted to be placed into and out of communication with the body passage in response to rotation relative to the body about a substantially vertical axis; spaced first and second support rings removably positioned within the vertical opening, the inner surfaces of the support rings bearing against corresponding outer surfaces of the ball plug, the outer face of the first support ring being planar and upwardly convergent with respect to the inner face thereof; an adjusting ring disposed between the outer face of the first support ring and an end portion of the body passage, said adjusting ring being vertically slidable along the outer face of the first support ring and having planar and downwardly convergent end faces, the inner of which is in juxtaposition to the outer face of the first support ring; means for preventing rotary movement of the first support ring relative to the adjusting ring; actuating means carried by the housing and coupled to the adjusting ring for varying the vertical position thereof, said actuating means comprising a vertically movable rod carried by and extending through the bonnet and operably connected to the upper portion of the adjusting ring; a tubular retainer coaxial with the body passage and projecting into the second support ring; and a sealing ring carried by the tubular retainer and bearing against the ball plug outer (end) surface adjacent the second support ring.

2. A ball valve according to claim 1 wherein said upper portion of the vertical opening is circular and the bonnet is right circular cylindrical and is slidable therein, the body and the bonnet being formed with facing annular grooves, the valve further comprising securing means registering with and engaged within the annular grooves.

3. A ball valve according to claim 2 wherein each of the annular grooves is substantially semi-circular in transverse configuration and the securing means comprises a plurality of ball members.

4. A ball valve according to claim 3 wherein the securing means also comprises a flexible connector extending through an opening in each ball member.

5. In a valve for controlling the flow of a fluid under pressure, a housing including a body having a passage for fluid flow therethrough and an opening extending downwardly from the top of said housing into open communication with said passage, and a bonnet extending across the upper portion of said opening and removably secured to said body, the upper portion of said opening being circular in cross-section and defining a cylindrical well for the reception of said bonnet, said bonnet being of right cylindrical configuration and having a diameter such as to slidably fit within said well, the walls of said well and said bonnet being provided with complementary facing semi-circular annular grooves which together define an annular groove of circular cross-section, a passage formed in said body and extending radially outwardly from the semi-circular annular groove thereof to the outside of said body, a plurality of ball members carried within said circularly cross-sectioned annular groove for securing said bonnet against axial removal from said well, and means for flexibly connecting said ball members in a continuous series from the first ball to the last ball.

6. The valve of claim 5 in which said flexible connecting means comprises a flexible wire cable extending through an opening in each said ball member, at least one end of said flexible cable extending from an end ball of said series of said ball members into said radial passage for retention therein.

* * * * *